United States Patent
Peck et al.

(10) Patent No.: US 7,478,683 B2
(45) Date of Patent: Jan. 20, 2009

(54) CYLINDER SYNCHRONIZATION FOR AN IMPLEMENT LIFT SYSTEM

(75) Inventors: Donald Ray Peck, Clive, IA (US);
David Carl Winter, Johnston, IA (US);
James T. Noonan, Boundurant, IA (US);
Richard Wayne Hook, West Des Moines, IA (US)

(73) Assignee: Deere & Company, Moline, IL (US)

( * ) Notice: Subject to any disclaimer, the term of this patent is extended or adjusted under 35 U.S.C. 154(b) by 332 days.

(21) Appl. No.: 11/193,646

(22) Filed: Jul. 29, 2005

(65) Prior Publication Data

US 2007/0023195 A1 Feb. 1, 2007

(51) Int. Cl.
*A01B 63/00* (2006.01)
(52) U.S. Cl. .................. 172/456; 172/4.5; 172/311; 172/489
(58) Field of Classification Search ................. 172/239, 172/311, 489, 2, 4.5, 452, 456, 458
See application file for complete search history.

(56) References Cited

U.S. PATENT DOCUMENTS

| | | | | |
|---|---|---|---|---|
| 3,663,032 A | | 5/1972 | Hook et al. | 280/43.23 |
| 3,948,327 A | * | 4/1976 | Parker et al. | 172/311 |
| 4,019,585 A | * | 4/1977 | Dezelan | 172/4.5 |
| 4,355,690 A | * | 10/1982 | Jensen et al. | 172/311 |
| 4,379,491 A | * | 4/1983 | Riewerts et al. | 172/328 |
| 4,721,168 A | * | 1/1988 | Kinzenbaw | 172/311 |
| 4,974,684 A | | 12/1990 | Stevens | 172/311 |
| 5,154,240 A | * | 10/1992 | Carrick | 172/311 |
| 5,427,182 A | * | 6/1995 | Winter | 172/2 |
| 5,449,042 A | * | 9/1995 | Landphair et al. | 172/456 |
| 5,957,218 A | | 9/1999 | Noonan et al. | 172/239 |
| 6,035,943 A | * | 3/2000 | Gerein et al. | 172/328 |
| 6,220,366 B1 | | 4/2001 | Noonan et al. | 172/311 |
| 6,860,335 B2 | * | 3/2005 | Arnett | 172/311 |

* cited by examiner

*Primary Examiner*—Thomas B Will
*Assistant Examiner*—Joel F Mitchell

(57) ABSTRACT

A lift system includes parallel connected cylinder circuits with cylinders mechanically tied together on a first lift wheel arm. The base end of a third cylinder connected to a second lift wheel arm is connected in parallel with the pair of cylinders. The rod end of the third cylinder is constrained for movement with the rod end of a fourth cylinder also connected to the second wheel arm. The rod end of one of the pair of cylinders is connected in series with the base end of the fourth cylinder to thereby constrain the third and fourth cylinders on the second lift wheel arm to move in unison with the pair of cylinders on the first lift wheel arm. Series cylinder circuits move the wing cylinders in unison with the main frame cylinders to keep the implement level. The hydraulic circuit is also plumbed to retract outer wing wheels during wing fold operations to eliminate outer wing wheel interference.

14 Claims, 2 Drawing Sheets

CYLINDER SYNCHRONIZATION FOR AN IMPLEMENT LIFT SYSTEM

FIELD OF THE INVENTION

The present invention relates generally to a hydraulic lift system for an agricultural implement and, more specifically, to a cylinder synchronization system for a multi-sectioned implement.

BACKGROUND OF THE INVENTION

Previously available foldable multi-sectioned agricultural implements include a main frame and two or more wing frames hinged to the ends of the main frame. A rockshaft with a pair of parallel connected lift cylinders constrained for operation in unison by the rockshaft raise and lower ground engaging wheels on the main frame. Each of the wing frames includes a lift cylinder connected in series with one of the parallel connected cylinders so that the implement raises and lowers in generally level fashion. Often, a single point depth control having a valve connected to the hydraulic circuit provides an adjustable depth stop function on lowering of the implement. Lift wheels on the wing frames have to be moved to specific locations for implement folding to avoid unwanted contact with tools or frame members.

Rockshafts are heavy, expensive and cumbersome, and rockshaft windup results in uneven depth control. Recent implements have featured individually controlled lift wheel arms on the main frame without a rockshaft connecting adjacent arms. However, without a rockshaft, synchronization of the cylinders on the main frame with those on the wing frames is difficult. Providing a hydraulic lift system wherein the lift cylinders operate in unison across the entire width of the machine as the implement raises and lowers level continues to be a problem. Uneven loading on the implement frame causes differential extension and retraction of parallel connected cylinders. Although sophisticated cylinder control systems such as shown in commonly assigned U.S. Pat. No. 5,957,218 are available and work well for lift systems without rockshafts, some operators still prefer simpler conventional and less expensive hydraulic systems. Further, providing desired wheel tuck features for folding of the machine for transport and unfolding of the machine for field operations without wheel interference often requires expensive and complicated hydraulic circuitry.

SUMMARY OF THE INVENTION

It is therefore an object of the present invention to provide an improved implement lift system for a multi-sectioned implement having a plurality of lift cylinders. It is a further object to provide such a system which overcomes most or all of the aforementioned problems.

It is another object of the present invention to provide an improved implement lift system having level lift and lower characteristics without use of rockshaft connected cylinders. It is yet another object to provide such a system which maintains cylinder synchronization without need for complicated and expensive control circuitry.

It is another object of the present invention to provide an improved implement lift system for a multi-sectioned implement providing level lift and a wheel tuck feature that eliminates wheel interference during folding and unfolding of the implement sections.

A lift system includes parallel connected cylinder circuits with the rod ends of a pair of the cylinders mechanically tied together on a first lift wheel arm on the main frame so the cylinders are constrained to move in unison. The base end of a third cylinder connected to a second lift wheel arm on the main frame is connected to the same source of hydraulic fluid under pressure as the base ends of the pair of cylinders. The rod end of the third cylinder is constrained for movement with the rod end of a fourth cylinder also connected to the second wheel arm. The rod end of one of the pair of cylinders is connected in series with the base end of the fourth cylinder to thereby constrain the third and fourth cylinders on the second lift wheel arm to move in unison with the pair of cylinders on the first lift wheel arm. Series circuits connect the rod end of one of the cylinders in each pair with a base end of a wing section lift arm cylinder so the wing cylinders move in unison with the main frame cylinders to keep the implement uniformly level across all main frame and wing frame sections.

The hydraulic circuit is also plumbed to retract outer wing wheels during wing fold operations to eliminate outer wing wheel interference. A switch responsive to wing fold cylinder retraction operates a pair of electrohydraulic valves to interconnect the implement lift circuit with the implement wing fold circuit. Upon activation of the switch, pressurized hydraulic fluid from the fold circuit is directed to the rod end of an outer wing cylinder causing the cylinder to retract. With the wing wheels retracted and the switch activated, the main frame cylinders can be extended and retracted without affecting the outer wing cylinders. This feature allows the machine to be lowered while in the folded transport position to lower the overall height of the machine without extending the outer wing wheels. When the machine is unfolded, the switch will be deactivated to allow the outer wing wheel to extend and to isolate the fold circuit from the lift circuit. Upon switch deactivation, all implement lift cylinders operate independently of the fold circuit.

These and other objects, features and advantages of the present invention will become apparent from the description which follows and from the drawings.

DESCRIPTION OF THE PREFERRED EMBODIMENT

Figure 1:
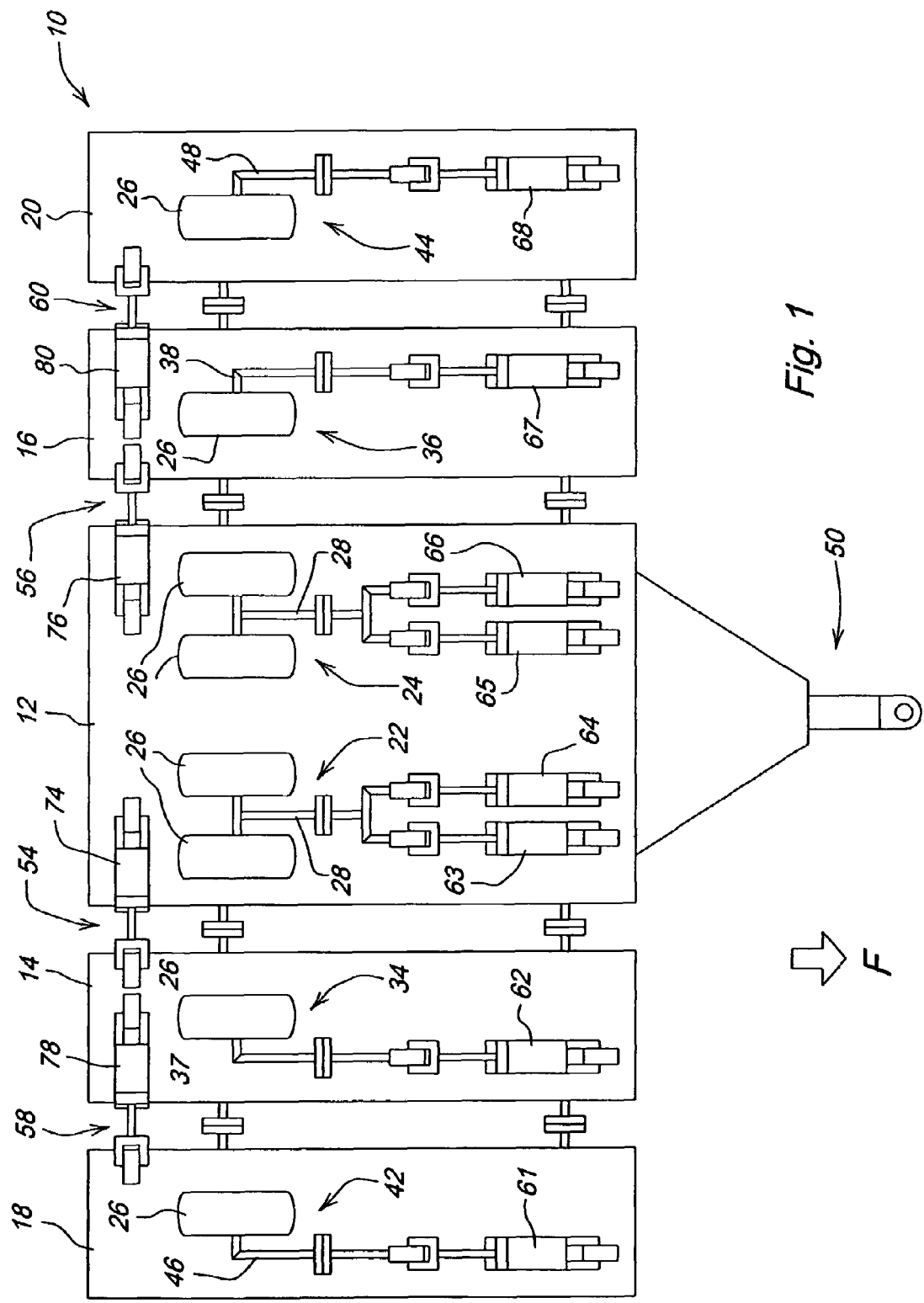
FIG. 1 is a schematic representation of a multi-section agricultural implement.

Referring now to FIG. 1, therein is shown a multi-section agricultural implement 10 having a main frame 12 and inner and outer wing frames 14,16 and 18, 20. The main frame 12 is supported in a conventional fashion by vertically movable lift wheel assemblies 22 and 24. The lift wheel assemblies include wheels 26 supported at the end of a lift arms or linkages 28 pivotally connected to the frame 12. The innermost wing frames 14 and 16 are supported by lift wheel assemblies 34 and 36 in the field-working position and include lift arms or linkages 37 and 38. The outermost wing frames 18 and 20 are hinged to the frames 14 and 16 which, in turn, are hinged to the outermost ends of the main frame 12. Lift wheel assemblies 42 and 44 including lift arms or linkages 46 and 48 support the outer wing frames 18 and 20 above the ground when the frame is in the field-working position as shown. Hitch structure 50 is connected to the forward portion of the main frame 12 for towing by a tractor or other vehicle 52 (FIG. 2).

The inner wing frames 14 and 16 are hinged to the main frame 12, and wing fold structure 54 and 56 pivot the frames relative to the main frame between field-working positions (FIG. 1) and a narrowed transport position. The outer wing frames 18 and 20 are moved relative to the inner frames 14 and 16 between the field-working and transport positions by wing fold structure 58 and 60.

Figure 2:
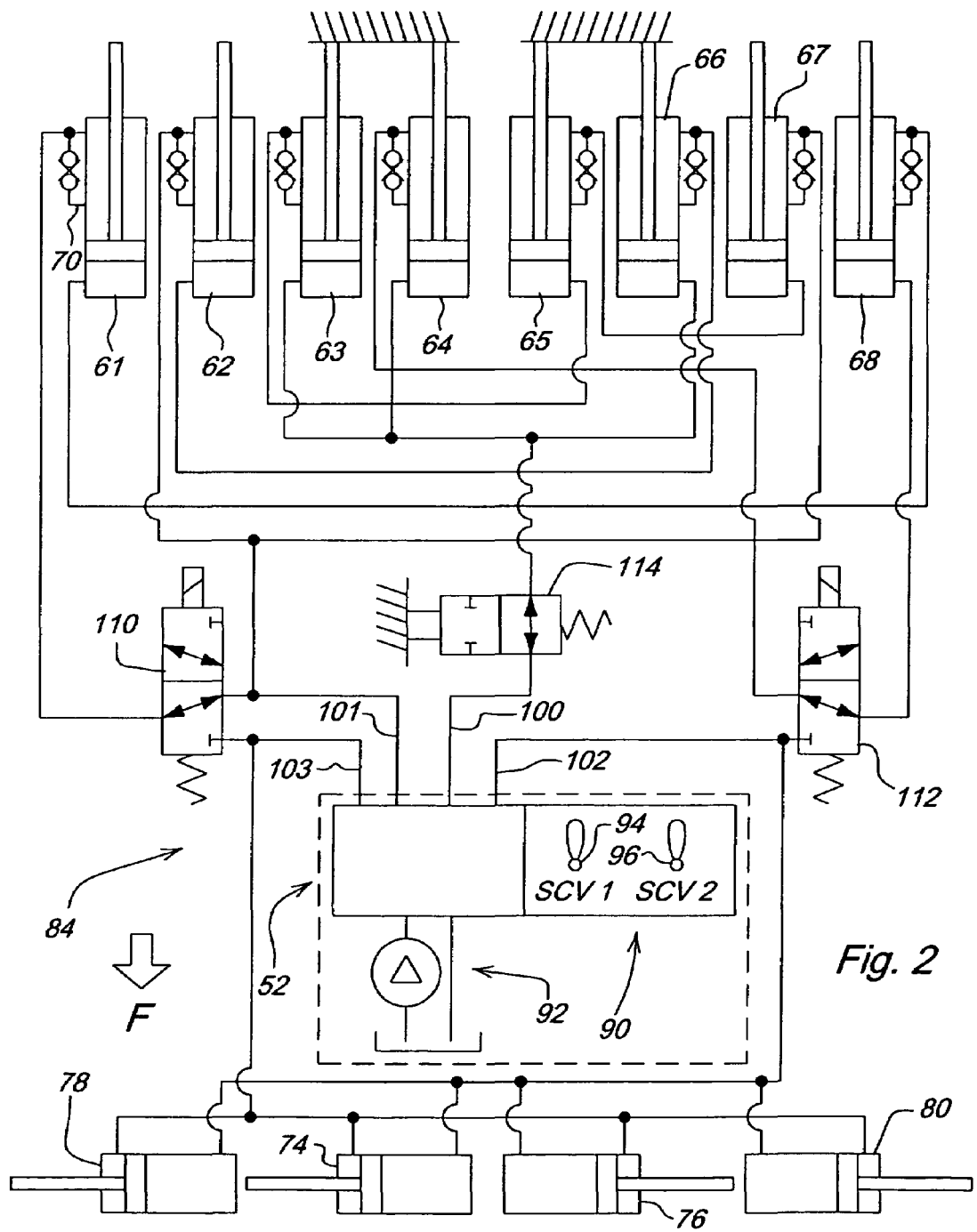
FIG. 2 is a schematic of the hydraulic circuit for the implement of FIG. 1.

Referring to FIG. 2, the hydraulic circuit for the lift wheel assemblies and the wing fold structures for a five section implement is shown in detail. Lift cylinders 61 and 62 are connected to the right-hand outer frame lift arms 46 and 37. Main frame cylinders pairs 63, 64 and 65, 66 are connected to the lift arms 28, and the cylinders of each pair are mechanically constrained for extension and retraction in unison. Lift cylinders 67 and 68 are connected to the left-hand outer frame lift arms 38 and 48. The cylinders are rephrasing cylinders and each includes by-pass structure 70 at the rod end of the cylinder to provide cylinder rephrasing at full extension of the cylinder rod.

The wing fold structures 54 and 56 include a right inner wing fold cylinder 74 and a left inner wing fold cylinder 76. The wing fold structures 58 and 60 include a right outer wing fold cylinder 78 and a left outer wing fold cylinder 80. The cylinders are connected to hydraulic actuation and control circuit indicated generally at 84 in FIG. 2. The actuation and control circuit 84 includes selective control valve (SCV) structure 90 operably connected to a source of hydraulic fluid under pressure 92 on the tractor 52. SCV switches 94 and 96 control SCV outputs 100, 101 and 102, 103 respectively, which are connected by hydraulic lines and by valves 110, 112, and 114 to the cylinders 61-68 and 74-80.

The hydraulic cylinders 63 and 64 have rod ends connected together mechanically for extension and retraction in unison. The base ends of the cylinders 63 and 64 are connected together hydraulically and are connected to the base end of the cylinder 66 so the three cylinders operate in parallel. To assure the cylinder pairs 65, 66 move in unison with the cylinder pairs 63, 64, the rod end of the cylinder 63 is connected to the base end of the cylinder 65. As the cylinder 63 extends and retracts, the cylinder 65 is constrained hydraulically to extend and retract in like manner. The rod ends of the remaining three main frame cylinders 64, 65 and 66 are each connected in series circuit configurations with the wing frame cylinders 61, 62, 67 and 68. The rod end of the main frame cylinder 65 is connected to the base end of the left inner wing cylinder 67 so the cylinder 67 extends and retracts in unison with the cylinder 65. The rod end of the main frame cylinder 66 is connected to the base end of the right inner wing cylinder 62 for movement in unison. The rod end of the main frame cylinder 64 is connected through the valve 112 to the base end of the left outer wing cylinder 68 so that when the valve 112 is in the normal operating position shown in FIG. 2, the cylinder 68 extends and retracts in unison with the cylinder 64. The base end of the right outer wing cylinder 61 is connected to the rod end of the cylinder 68 so that the outer wing cylinders 68 and 61 operate in series and are controlled by the cylinder 64. Therefore, the three inner wing cylinders 64, 65 and 66 act as the control cylinders for the three series hydraulic circuits that operate the wing lift cylinders, and the cylinder 63 acts as the control cylinder for synchronizing the operation of the main frame cylinder pairs 63, 64 and 65, 66.

The base ends of the cylinders 63, 64 and 66 are connected through the normally open depth stop valve 114 to the SCV 1 output 100, and the rod ends of the cylinders 61, 62 and 67 are connected to the SCV 1 output 101. Assuming the cylinders 61-68 are extended and the implement 10 is raised so the depth stop valve 114 is in the open position shown, the operator can push the SCV 1 switch 94 forward to pressurize the output 100 connected to the rod ends of the cylinders 61, 62, and 67. The SCV 1 output 101 is returned to sump so the main frame cylinders 63, 64 and 66 can retract in unison with the wing frame cylinders. As the main frame cylinder 65 retracts with the cylinder 66, hydraulic fluid from the base end of the cylinder 65 passes to the rod end of the retracting cylinder 64 to maintain synchronization between the cylinder pairs 63, 64 and 65, 66. The series connections of the outer frame cylinders helps maintain a uniform levelness across the implement 10. The implement will continue to lower until the operator releases the SCV 1 switch 94 or until the depth stop valve 114 is closed as the implement reaches a prescribed operating depth. Once the operating depth is reached and the valve 114 closes, flow from the base ends of the cylinders 63, 64 and 66 is stopped, preventing further lowering of the implement and maintaining the implement in the depth stop position.

To raise the implement 10, the operator pulls the switch 94 to pressurize the output 100 and return the output 101 to sump. The depth stop valve 114 is responsive to pressure at the output 100 to move to the open position and allow flow from the output 100 to the base ends of the cylinders 63, 64 and 66 to extend the cylinders 61-68 in unison and raise the implement 10 in a level condition.

The wing fold cylinders 74, 76, 78 and 80 are connected in parallel and have rod ends connected to the SCV 2 output 103. The base ends of the cylinders 74-80 are connected together and to the SCV 2 output 102. When the operator pulls the SCV 2 switch 96 back, the output 103 will be pressurized to retract the fold cylinders 74-80. The outer wing cylinders 78 and 80 will retract first since there is less force required for the outer wing fold operation. Thereafter, the inner wing fold cylinders 74 and 76 will retract to fold both sets of wing frames 14, 18 and 16, 20 over the main frame 12. To reverse the operation and unfold the implement for field-working, the operator pushes the switch 96 to pressurize the SCV 2 output 102.

To eliminate outer wing tire interference, the circuit 84 is also plumbed to retract the outer wing cylinders 61 and 68 to cause the outer wing wheels to tuck into the wing frames during the fold operation. With the lift cylinders 61-68 extended and the implement in the raised position, the valves 110 and 112 are automatically activated (moved downwardly as depicted in FIG. 2) during wing folding. The valves 110 and 112 are activated in a conventional manner, such as by position-responsive switch structure located on the implement frame. The activation of the valves 110 and 112 interconnects the fold hydraulic SCV 2 outputs 102, 103 with lines connected to the outer wing cylinders 61 and 68. The rod end of the right outer wing cylinder 61 is connected to the SCV 2 output 103 pressurizing rod end of the cylinder 61 which, in turn, causes the series connected cylinder to retract. Hydraulic fluid from the base end of the cylinder 68 is returned to the fold circuit via valve 112. With the outermost wing wheels 26 retracted and the valves 110 and 112 activated, the main frame cylinders 63-66 can be extended and retracted without any affect on the outer wing cylinders 61 and 68. This allows the implement 10 to be lowered, for example to get through a low opening, without having to extend the outer wing wheels. When the valves 110 and 112 are inactivated and in the position shown in FIG. 2, all of the lift cylinders 61-68 operate independently of the fold circuit.

Having described the preferred embodiment, it will become apparent that various modifications can be made without departing from the scope of the invention as defined in the accompanying claims.

The invention claimed is:

1. A hydraulic lift system for a multi-sectioned agricultural implement having a main frame and outer wing frames movably connected to the main frame, the lift system comprising:
   first and second lift wheel arms connected to the main frame:
   first and second lift cylinders havinci rod and base ends, the first and second lift cylinders connected to the first lift wheel arm and constrained for movement together in unison with the first lift wheel arm independently of rockshaft structure:
   third and fourth lift cylinders having rod and base ends, the third and fourth cylinders connected to the second lift wheel arm and constrained for movement together in unison:
   wherein the first and second cylinders are connected in parallel and are constrained for extension and retraction together with movement of the first lift wheel arm, and the base ends of the first and second cylinders are connected to the base end of the fourth cylinder and to a source of hydraulic fluid under pressure for extending and retracting the first, second and fourth cylinders:
   a conduit connecting the rod end of the first cylinder with the base end of the third cylinder to thereby synchronize the movement of the first and second cylinders with the third and fourth cylinders independently of any mechanical linkage between the first and second lift wheel arms:
   fifth and sixth wing lift cylinders connected to outer wing frames, the fifth cylinder connected for operation in series with one of the first and second cylinders and the sixth cylinder connected for operation in series with one of the third and fourth cylinders so that the main frame and the wing frames move vertically generally in unison:
   wherein the fifth and sixth wing lift cylinders are connected to wing lift wheel assemblies, and further including a wing fold cylinder circuit connected to the outer wings for folding the wings between transport and field-working positions, and connecting valve structure selectively interconnecting the wing fold cylinder circuit with the lift cylinders for operating the wing lift cylinders to prevent interference between the wing lift wheel assemblies and portions of the implement during the folding of the wings: wherein the connecting valve structure facilitates implement lowering when the wings are folded in the transport position.

2. The lift system as set forth in claim 1 including a depth stop valve connected to the base ends of the first and third cylinders and providing adjustable implement depth control.

3. The lift system as set forth in claim 1 including seventh and eighth lift cylinders connected to the outer wing frames, the fifth, sixth, seventh and eighth cylinders comprising two series circuits connected in series with the third and fourth cylinders.

4. A hydraulic lift system for a multi-sectioned agricultural implement having a main frame and outer wing frames movably connected to the main frame, the lift system comprising:
   first and second lift wheel arms connected to the main frame;
   first and second lift cylinders having rod and base ends, the rod ends of the first and second lift cylinders connected to the first lift wheel arm and constrained for movement together in unison with movement of the first lift wheel arm independently of rockshaft structure;
   third and fourth lift cylinders having rod and base ends, the third and fourth cylinders connected to the second lift wheel arm and constrained for movement together in unison;
   wherein the first and second cylinders are connected in parallel and are connected to the fourth cylinder and to a source of hydraulic fluid under pressure for extending and retracting the first, second and fourth cylinders;
   means hydraulically connecting the first cylinder with the third cylinder to thereby synchronize the movement of the first and second cylinders with the third and fourth cylinders independently of any mechanical linkage between the first and second lift wheel arms;
   a plurality of wing lift cylinders connected to outer wing frames, and means connecting the wing lift cylinders for operation in series with two of the first, second, third and fourth cylinders to move the main frame and the wing frames vertically generally in unison; and
   an outer frame fold cylinder structure and fold circuit for operating the frame fold cylinder structure to fold the outer wing frames between field-working and transport positions. and means for selectively connecting the fold circuit to the wing lift cylinders to operate the wing lift cylinders during folding: wherein the means for selectively connecting the fold circuit to the wing lift cylinders includes valve structure selectively connecting wing cylinders to the fold circuit for retracting the wing cylinders when the frame fold cylinder structure is operated.

5. The lift system as set forth in claim 4 including means for operating the first, second, third and fourth cylinders to move the main frame vertically without moving the wing lift cylinders when the outer wings are in the transport positions.

6. The lift system as set forth in claim 4 wherein the valve structure includes first and second switchable valves.

7. The lift structure as set forth in claim 4 including first selective control valve structure connected to the base ends of the first, second and fourth cylinders and second selective control valve structure connected to the wing lift cylinders.

8. A hydraulic lift system for a multi-sectioned agricultural implement having a main frame and outer wing frames movably connected to the main frame, the lift system comprising:
   first and second individually mounted lift wheel arms connected to the main frame;
   first and second lift cylinders having rod and base ends, and means connecting the first and second lift cylinders to the first lift wheel arm for movement together in unison with the first lift wheel arm independently of rockshaft structure between the first and second lift cylinders;
   third and fourth lift cylinders having rod and base ends, the third and fourth cylinders connected to the second lift wheel arm and constrained for movement together in unison;
   means connecting the first and second lift cylinders in parallel;
   means for hydraulically synchronizing the movement of the first and second cylinders with the third and fourth cylinders independently of any mechanical linkage between the first and second lift wheel arms;
   a plurality of wing lift cylinders connected to outer wing frames;
   means for connecting the wing lift cylinders in series with at least one of the first, second, third and fourth cylinders; and
   further comprising wing frame fold cylinders, and a hydraulic fold control circuit for activating the fold cylinders to move the wing frames to a transport position, and means for selectively connecting the fold control circuit to the wing lift cylinders to move the wing lift cylinders to a retracted position with folding of the wing frames to the transport position.

9. The lift system as set forth in claim 8 further comprising a depth stop valve connected to the means connecting the first and second lift cylinders in parallel.

10. The lift system as set forth in claim 8 wherein the wing lift cylinders include a fifth cylinder connected for operation in series with one of the first and second cylinders and a sixth cylinder connected for operation in series with one of the third and fourth cylinders so that the main frame and the wing frames move vertically generally in unison.

11. A hydraulic lift system for a multi-sectioned agricultural implement having a main frame and foldable outer wing frames connected to the main frame for movement to and from a field-working position, the lift system comprising:
   first and second lift wheel arms connected to the main frame;
   main frame lift cylinders connected to the first and second lift arms for raising and lowering the lift arms with respect to the main frame;
   wing frame wheel arms connected to the outer wing frames;
   wing frame lift cylinders connected to the wing frame wheel arms for raising and lowering the outer wing frames in the field-working position;
   hydraulic lines connecting the wing frame lift cylinders and the main frame lift cylinders for operation generally in unison;
   a plurality of wing fold cylinders connected to outer wing frames; first selective control valve structure connected to the main frame lift cylinders and wing frame lift cylinders for raising and lowering of the main frame and wing frames when in the field-working position;
   second selective control valve structure connected to the wing fold cylinders for folding and unfolding the outer wing frames;
   automatic valve structure connected to the second selective control valve structure and the wing frame lift cylinders for automatically operating the wing frame lift cylinders independently of the first selective control valve structure as the wing frames move from the field-working position to cause the wing frame wheel arms to move to a non-interfering position;
   wherein the main frame lift cylinders comprise first and second pairs of cylinders, the first pair of cylinders connected to a single one of the lift arms and constrained for operation in unison with movement of the single one of the lift arms independently of rockshaft structure; and
   wherein the automatic valve structure includes an electro-hydraulic valve responsive to the folding of the wing frames to hydraulically connect the wing frame lift cylinders to the wing fold cylinders to move the wing lift cylinders to a retracted position with folding of the wing frames to the transport position.

12. The lift system as set forth in claim 11 including structure connecting one cylinder of the first pair of cylinders in series with one cylinder of the second pair of cylinders.

13. The lift system as set forth in claim 11 wherein the automatic valve structure is connected to the hydraulic lines and includes an activated position interrupting movement in unison with the wing frame lift cylinders and the main frame lift cylinders and facilitating vertical movement of the main frame without movement of the wing frame wheel arms.

14. The lift system as set forth in claim 13 wherein the wing frame lift cylinders comprise inner and outer wing frame cylinders, and wherein the outer wing frame cylinders are connected to the automatic valve structure.

* * * * *